United States Patent Office 3,629,149
Patented Dec. 21, 1971

3,629,149
HYDROCARBON HYDROCONVERSION
CATALYST
Bernard F. Mulaskey, Pinole, Calif., assignor to Chevron Research Company, San Francisco, Calif.
No Drawing. Filed Nov. 29, 1968, Ser. No. 780,233
Int. Cl. B01j 11/74, 11/40
U.S. Cl. 252—439        5 Claims

ABSTRACT OF THE DISCLOSURE

A novel catalyst composition comprising a crystalline zeolitic aluminosilicate in association with from 2 to 15 weight percent nickel, or compounds thereof, and from 0.5 to 10 weight percent arsenic, or compounds thereof.

BACKGROUND OF THE INVENTION

Field

The present invention relates to a novel hydroconversion catalyst. More particularly, the present invention relates to a catalytic composition comprising nickel and arsenic, or their compounds, associated with a crystalline zeolitic aluminosilicate and hydroconversion processes, particularly hydrocracking processes, using said catalysts.

Prior art

It is known that crystalline zeolitic aluminosilicates can be used as catalysts in a variety of hydroconversion processes including, by way of example, isomerization, disproportionation, reforming, hydrofining, including hydrodenitrification and hydrodesulfurization, and hydrocracking. The crystalline zeolitic aluminosilicates can be used either alone or can be admixed with amorphous porous inorganic oxides. A variety of different metals can be associated with the crystalline zeolitic aluminosilicates, the particular choice depending on the hydroconversion processes involved. Nickel has been suggested as a suitable metal for use with crystalline zeolitic aluminosilicate-containing catalysts. However, nickel, in the presence of crystalline zeolitic aluminosilicates, has the disadvantage of displaying rapid crystallite growth during hydroconversion reactions. The growth of nickel crystallites apparently leads to catalyst deactivation and difficulties in catalyst regeneration.

SUMMARY OF THE INVENTION

The object of the present invention is to provide an improved catalyst comprising a crystalline zeolitic aluminosilicate, nickel, or compounds of nickel, and arsenic, or compounds of arsenic. The novel catalyst is particularly useful in hydrocracking processes. The presence of arsenic inhibits the growth of nickel crystallites.

Thus, the present invention is directed to a catalytic composition of matter comprising a crystalline zeolitic aluminosilicate, preferably a crystalline zeolitic aluminosilicate having uniform pore diameters of at least 6 angstroms, in association with nickel and arsenic, or their compounds, said nickel being present in an amount of from 2 to 15 weight percent based on the finished catalyst, and said arsenic being present in an amount of from 0.5 to 10 weight percent based on the finished catalyst.

DESCRIPTION OF THE INVENTION

Crystalline zeolitic aluminosilicates, referred to hereinafter as zeolites, are well known in the art. Zeolites which are particularly advantageous for purposes of the present invention comprise aluminosilicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be absorbed. Thus, the zeolites are often referred to as molecular sieves. In general, the zeolites have exchangeable zeolitic cations associated with the silica-alumina tetrahedra which balance the negative electrovalence of the tetrahedra. The cations may be any number of ions such as, for example, the alkali metal ions, the alkaline earth ions, and the rare earth ions. The cations may be mono-, di-, or trivalent. In general the preferred forms of zeolites are those wherein the exchangeable zeolitic cations are divalent metals, and/or hydrogen. Normally the zeolites are prepared first in the sodium or potassium form, after which the monovalent cations are ion-exchanged with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The above-described zeolites useful for purposes of the present invention possess relatively well-defined pore structures. It is preferred that the pore structure of the zeolites comprise openings characterized by pore diameters greater than 6 angstroms and particularly uniform pore diameters of approximately 6–15 angstroms. The uniform pore structure wherein the pores are greater than 6 angstroms permits hydrocarbons access to the catalyst. Furthermore, zeolites which find the greatest use for purposes of the present invention have silica/alumina ratios in the crystalline form greater than about 2. Examples of appropriate crystalline zeolitic aluminosilicates, i.e., zeolites are the natural faujasites, synthesized zeolite X disclosed in U.S. Pat. 2,882,244, zeolite Y disclosed in U.S. Pat. 3,130,007, zeolite L disclosed in U.S. Pat. 3,216,789, and decationized zeolite Y described in U.S. Pat. 3,130,-006. Mordenites may also be used.

Crystalline zeolitic aluminosilicates which are encompassed by the present invention include not only zeolites which have relatively well-defined pore structures but also zeolites having layered or clay-type structures. Thus layered zeolites of the type described in U.S. Pat. 3,252,757 can be used.

The catalytic composition of the present invention comprises nickel, or compounds thereof, present in the finished catalyst in an amount of from 2 to 15 weight percent, calculated as metal, and, more preferably, from 3 to 12 weight percent. Arsenic, or compounds thereof, are preferably present in the finished catalyst in an amount of from 0.5 to 10 weight percent and more preferably, from 0.5 to 5 weight percent, calculated as metal. The nickel and arsenic can exist in the catalyst either as metallic nickel and metallic arsenic or as compounds, such as the oxides or sulfides. The sulfide form of the metals, particularly the sulfide form of nickel, is the preferred compound form for purposes of the present invention. However, any compounds of the metals which perform as hydrogenating components can be used in the catalyst.

An amorphous porous inorganic oxide material can be present in association with the zeolite, nickel and arsenic. Preferably, the amorphous porous inorganic oxide will have a high surface area, for example, greater than 50 m.$^2$/gm. and preferably, greater than 150 m.$^2$/gm. Suitable amorphous porous inorganic oxides which can be admixed with the zeolite include the oxides of the metals and nonmetals of Groups II through VI of the Periodic Table. Suitable inorganic oxides include silica, alumina, magnesia, titania, zirconia, and combinations thereof. For hydrocracking purposes, it is preferred that the amorphous porous inorganic oxide comprises a siliceous oxide. Thus, suitable siliceous oxides include, by way of example, silica-alumina, silica-magnesia, silica-zirconia, silica-titania, silica-alumina-zirconia and silica-magnesia-titania. The zeolite can be physically admixed with the porous amorphous inorganic oxide or the zeolite can exist in a matrix of the porous amorphous inorganic oxide. Thus, for example, the amorphous porous inorganic oxide may be prepared by cogelling or coprecipitating compounds of the metals and/or nonmetals of Groups II through VI. The zeolite may be added during the coprecipitation or cogelation process. It is not necessary that the nickel and arsenic be present on the zeolite; the metals can be in admixture with the amorphous porous inorganic oxide. For example, a silica-alumina cogel may be prepared by precipitating an aqueous solution of aluminum chloride and a compound of silica, for example, sodium silicate, with ammonium hydroxide. The nickel and/or arsenic can be present in the aqueous solution prior to precipitation as, for example, nickel chloride and/or arsenic chloride. The zeolite can be added during the precipitation process.

When an amorphous porous inorganic oxide is present as part of the catalyst, it is preferred that at least 10 weight percent zeolite based on the finished catalyst be present and preferably at least 20 weight percent zeolite. The zeolite should be in intimate association with the nickel and arsenic. It is preferred, of course, that the catalyst consist essentially of zeolite, nickel, or compounds thereof, and arsenic, or compounds thereof.

The metal components, nickel and arsenic, as indicated, can be disposed on the zeolite or can be disposed in an amorphous porous inorganic oxide carrier which is intimately admixed with the zeolite. When incorporating the metals with the zeolite, various preparation procedures can be used. Thus, the metals can be associated with the zeolite by impregnation which is generally accomplished by using an aqueous solution of a suitable nickel compound and/or arsenic compound. Either simultaneous or sequential impregnation of the metal compounds is suitable. Also the metals can be associated with the zeolite by ion-exchange. Ion-exchange is generally accomplished by using an aqueous solution of a suitable metal salt wherein the nickel and/or arsenic is present in the cationic state. Nickel and/or arsenic replaces the sodium or other exchangeable cations present in the zeolite. Typical nickel and/or arsenic compounds which can be used for impregnation or ion-exchange are the chlorides, nitrates, sulfates, acetates, and amine complexes. Arsenic compounds, particularly useful, especially for impregnation, are the organic compounds including aryl or alkyl substituted organo-metallics, such as triphenyl arsine. It is understood that one of the metals can be associated with the zeolite by one method, e.g., by impregnation, and the other metal associated with the zeolite by another method, e.g., ion-exchange. Another method of associating the metals with the zeolite is by vapor-phase adsorption.

The nickel and arsenic components can be associated with the armorphous porous inorganic oxide, if such is present, by various means, e.g., impregnation or coprecipitation. One of the metals can be incorporated with the inorganic oxide by one method and the other by another method. It is also encompassed as part of the present invention to have one of the metals present as part of the amorphous porous inorganic oxide and the other metal associated with the zeolite.

The novel catalytic composition of the present invention may find utility for various hydrocarbon hydroconversion reactions including hydrofining, hydrogenation, reforming, isomerization, and hydrocracking. The hydrocarbon feeds employed and the reaction conditions will depend on the particular hydrocarbon hydroconversion process involved and are generally well known in the petroleum art. Thus, for example, typical feedstocks which can be used for purposes of the present invention include feeds boiling from below 300° F. to 1000° F. or higher. Particular feedstocks which may be used include heavy virgin crudes, vacuum distillation residues, catalytic cycle oils, gas oils resulting from the visbreaking of heavy oils, solvent deasphalted oils, and hydrocarbon distillates. The feedstocks can contain nitrogen and/or sulfur compounds. These hydrocarbon fractions can be derived from petroleum crude oils, gilsonite, shale oils, tar sand oils, coal hydrogenation and carbonization products and the like.

The conditions of temperature, pressure, hydrogen flow rate and liquid hourly space velocity in the reaction zone can be correlated and adjusted depending on the particular feedstock utilized, the particular hydrocarbon hydroconversion process, and the products desired.

The catalyst is particularly advantageous for hydrocracking. Hydrocracking is generally acomplished at a temperature of from about 450° F. to 900° F. and a pressure between about 500 to 10,000 p.s.i.g. The higher temperatures and pressures are used with higher boiling feedstocks. Preferably pressures between 1200 and 6000 p.s.i.g. are used. The hydrogen flow rate into the reactor is maintained between 1,000 to 20,000 s.c.f./bbl. of feed and preferably in the range 4,000 to 10,000 s.c.f./bbl. The hydrogen consumption will vary depending on the properties of the feed and the other hydrocracking conditions used, but there is generally consumed in the hydrocracking zone at least 500 s.c.f. hydrogen per barrel of feed. In general, the hydrogen consumption will range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably, 0.3 to 5.

The novel catalyst of the present invention and hydrocracking using the catalyst may be better understood by reference to the following example.

EXAMPLE

A catalyst comprising a nickel and zeolite was prepared and compared by hydrocracking with a catalyst comprising nickel, arsenic and zeolite.

The nickel-zeolite catalyst was prepared as follows: 100 grams of an ammonium Y zeolite was contacted with 50 milliliters of an aqueous solution containing 50.8 grams of $Ni(NO_3)_2 \cdot 6H_2O$. The entire solution was absorbed by the zeolite. Thereafter the catalyst was calcined in air for 2 hours each at 400° F., 600° F., 800° F., 1000° F., and 1250° F. The nickel-arsenic-zeolite catalyst was prepared by contacting a portion of the above-described calcined nickel-zeolite with a solution prepared by dissolving 10.2 grams of triphenyl arsine in 60 milliliters of hexane. The resulting nickel-arsenic catalyst was dried at 200° F. The nickel-zeolite catalyst contained about 10 weight percent nickel. The nickel-arsenic-zeolite catalyst contained about 10 weight percent nickel and 2.5 weight percent arsenic. Both catalysts were sulfided by contact with a mixture of dimethyldisulfide and mixed hexanes in flowing hydrogen.

The catalysts were used for hydrocracking a light catalytic cycle oil having the following specifications:

| | |
|---|---|
| Gravity, ° API | 29.3 |
| Aniline point, ° F. | 119.4 |
| Nitrogen, p.p.m. | 0.14 |
| Aromatics, vol. percent | 29.4 |
| Naphthenes, vol. percent | 59.6 |
| Paraffins, vol. percent | 11.0 |
| Feed distillation range, ° F.: | |
| Start | 406 |
| 5% | 438 |
| 10% | 453 |
| 30% | 480 |
| 50% | 511 |
| 70% | 557 |
| 90% | 624 |
| 95% | 658 |
| End point | 719 |

The hydrocracking reaction conditions included a pressure of 1200 p.s.i.g., a liquid hourly space velocity of 2.0, and a hydrogen to hydrocarbon rate of 12,000 s.c.f./bbl. From the measured conversion of the feed to lower boiling products, the temperature required for 60 percent conversion was determined. The nickel-zeolite required a temperature of about 597° F. for 60 percent conversion. On the other hand, the nickel-arsenic-zeolite catalyst only required a temperature of 588° F. Thus, arsenic measurably improved the activity of the nickel-zeolite catalyst.

The aniline point at 60 percent conversion was also determined. The aniline point of the product gives an indication of the relative tendency of the catalyst to hydrogenate aromatics present in the feed. An increase in aniline point corresponds to a decrease in the aromaticity of the product or an increase in the hydrogenation activity of the catalyst. The aniline point of the product obtained from the hydrocracking process using the nickel-zeolite catalyst was about 121.8. The aniline point of the product for the hydrocracking process using the nickel-arsenic-zeolite catalyst was about 122.9. Thus, the presence of arsenic increased the hydrogenation activity of the nickel-zeolite catalyst.

The used nickel-zeolite catalyst and the used nickel-arsenic-zeolite catalyst were examined in an X-ray diffractometer with nickel filtered $CuK_{\alpha1,2}$ radiation. The nickel sulfide ($Ni_3S_2$) crystallites in the catalyst comprising nickel and zeolite arsenic were from 275 to 350 angstroms in size. The nickel sulfide ($Ni_3S_2$) crytallites in the catalyst comprising nickel, arsenic, and zeolite were from 150 to 200 angstroms in size. Thus the presence of arsenic resulted in a significant reduction in the size of the nickel-containing crystallites.

Zeolites have the undesirable effect of enhancing the growth of nickel crystallites during hydrocracking, which crystallite growth leads to increased deactivation of the catalyst. This phenomenon in the past has led to the use of other, more stable, hydrogenating metal components such as palladium in zeolite combinations. The presence of arsenic with nickel and zeolite reduces the growth of nickel crystallites on the catalyst during hydrocracking. Thus the presence of arsenic with a nickel-zeolite containing catalyst significantly improves the value of the catalyst for hydroconversion operations.

The foregoing disclosures of this invention are not to be considered as limiting since many variations can be made by those skilled in the art without departing from the scope or spirit of the appended claims.

I claim:
1. A hydrocarbon hydrocracking catalyst comprising a crystalline zeolitic aluminosilicate, in association with nickel, or nickel sulfide or nickel oxide, and arsenic, or arsenic sulfide or arsenic oxide, said nickel, or nickel sulfide or nickel oxide being present in an amount of from 2 to 15 weight percent, calculated as metal, and said arsenic, or arsenic sulfide or arsenic oxide being present in an amount of from 0.5 to 10 weight percent, calculated as metal.
2. The catalyst of claim 1 wherein said crystalline zeolitic aluminosilicate is of the Y-type.
3. The catalyst of claim 1 wherein said crystalline zeolitic aluminosilicate is decationized.
4. The catalyst of claim 1 wherein an amorphous porous inorganic oxide is present.
5. A hydrocracking catalyst consisting essentially of a crystalline zeolitic aluminosilicate having uniform pore diameters of from 6 to 15 angstroms, a silica to alumina mole ratio of at least 2, nickel, or nickel sulfide or nickel oxide, and arsenic, or arsenic sulfide or arsenic oxide, said nickel, or nickel sulfide or nickel oxide being present in an amount of from 2 to 15 weight percent calculated as metal, and said arsenic, or arsenic sulfide or arsenic oxide being present in an amount of from 0.5 to 10 weight percent calculated as metal.

References Cited
UNITED STATES PATENTS

| | | | |
|---|---|---|---|
| 3,206,391 | 9/1965 | Gutberlet et al. | 252—459 X |
| 3,248,316 | 4/1966 | Barger, Jr. et al. | 208—111 X |
| 3,390,074 | 6/1968 | Mulaskey | 208—111 |
| 3,405,055 | 10/1968 | Bittner | 208—111 |
| 3,417,157 | 12/1968 | Pollitzer | 252—456 X |

DANIEL E. WYMAN, Primary Examiner

C. F. DEES, Assistant Examiner

U.S. Cl. X.R.

252—455 Z, 456, 459